United States Patent
Maier

(10) Patent No.: US 10,597,083 B2
(45) Date of Patent: Mar. 24, 2020

(54) PLACEMENT OF BATTERY ELEMENTS IN TUNNEL

(71) Applicant: Thunder Power Electric Vehicle Limited, Ganzhou (CN)

(72) Inventor: Jens Maier, Milan (IT)

(73) Assignee: Thunder Power Electric Vehicle Limited, Ganzhou (CN)

(*) Notice: Subject to any disclaimer, the term of this patent is extended or adjusted under 35 U.S.C. 154(b) by 39 days.

(21) Appl. No.: 15/697,003

(22) Filed: Sep. 6, 2017

(65) Prior Publication Data

US 2018/0065674 A1 Mar. 8, 2018

Related U.S. Application Data

(60) Provisional application No. 62/384,298, filed on Sep. 7, 2016.

(51) Int. Cl.
*B60K 1/04* (2019.01)
*B62D 25/20* (2006.01)
(Continued)

(52) U.S. Cl.
CPC .............. *B62D 21/152* (2013.01); *A62C 3/07* (2013.01); *B60K 1/04* (2013.01); *B60L 3/0007* (2013.01);
(Continued)

(58) Field of Classification Search
CPC .... B62D 21/152; B62D 25/082; B62D 25/20; B62D 27/023; A62C 3/07; B60L 50/64; H01M 2/10; H01M 2/20
See application file for complete search history.

(56) References Cited

U.S. PATENT DOCUMENTS 5,501,289 A * 3/1996 Nishikawa ............... B60K 1/04
180/68.5
6,227,322 B1 * 5/2001 Nishikawa .............. B60R 16/04
180/65.1
(Continued)

FOREIGN PATENT DOCUMENTS

FR 2 942 763 A1 9/2010
WO 2010/136863 A1 12/2010
(Continued)

OTHER PUBLICATIONS

European Search Report for EP 17189983 dated Jan. 26, 2018, 10 pages.

*Primary Examiner* — Bryan A Evans
(74) *Attorney, Agent, or Firm* — Kilpatrick Townsend & Stockton, LLP

(57) ABSTRACT

A power system for an electric vehicle including a firewall positioned between an engine compartment and a passenger compartment of the vehicle. A floor structure of the vehicle is coupled with the firewall and defines an aperture between the firewall and a central support beam of the floor structure. A battery assembly is configured to mount with an underside of the floor structure having a battery and a battery connector housing to house a battery connector. The connector housing defines an electric connector to couple with an electric system of the vehicle. The connector housing is inserted within the aperture of the floor structure such that at least a portion of the battery connector housing extends above the floor structure. A rigid tunnel is coupled with the firewall, the floor structure, and the central support beam to cover the portion of the connector housing that extends above the floor structure.

20 Claims, 10 Drawing Sheets

(51) Int. Cl.
*H01M 2/10* (2006.01)
*B62D 21/15* (2006.01)
*A62C 3/07* (2006.01)
*B60L 3/00* (2019.01)
*B62D 25/08* (2006.01)
*B62D 27/02* (2006.01)

(52) U.S. Cl.
CPC ........... *B62D 25/082* (2013.01); *B62D 25/20* (2013.01); *B62D 25/2045* (2013.01); *B62D 27/023* (2013.01); *H01M 2/10* (2013.01); *B60K 2001/0438* (2013.01); *B60K 2001/0472* (2013.01)

(56) References Cited

U.S. PATENT DOCUMENTS

| | | | |
|---|---|---|---|
| 8,006,793 B2 * | 8/2011 | Heichal | B60K 1/04 180/68.5 |
| 8,079,435 B2 * | 12/2011 | Takasaki | B60K 1/04 180/68.5 |
| 8,336,658 B2 * | 12/2012 | Rawlinson | B60N 2/012 180/68.5 |
| 8,776,927 B2 * | 7/2014 | Akazawa | H01M 2/1077 180/68.5 |

FOREIGN PATENT DOCUMENTS

| | | |
|---|---|---|
| WO | 2015/162725 A1 | 10/2015 |
| WO | 2016/012663 A1 | 1/2016 |

* cited by examiner

1000

1002 — INSERT A BATTERY CONNECTOR HOUSING WITHIN AN APERTURE OF A FLOOR STRUCTURE

1004 — FASTEN A BATTERY ASSEMBLY TO AN UNDERSIDE OF AN ELECTRIC VEHICLE

1006 — ELECTRICALLY COUPLE AT LEAST ONE ELECTRICAL SYSTEM OF THE VEHICLE TO A CONNECTOR OF THE BATTERY

FIG. 10

PLACEMENT OF BATTERY ELEMENTS IN TUNNEL

CROSS REFERENCE TO RELATED APPLICATIONS

This application is a non-provisional of U.S. Provisional Application No. 62/384,298 filed on Sep. 7, 2016, the complete disclosure of which is herein incorporated by reference.

BACKGROUND OF THE INVENTION

There are many problems unique to electric vehicles, oftentimes due to the presence of large and/or numerous batteries used to power the electric motor and other components of the vehicle. These batteries are often bulky, and add significant weight to the vehicles. These considerations present challenges in designing a particularly efficient and practical electrical vehicle. Additionally, these batteries may be particularly susceptible to damage during a collision. Damage to a battery may be especially dangerous by presenting a fire and/or corrosive hazard. As such, protecting the batteries from damage remains a difficult challenge unique to the field of electric vehicles.

Vehicle manufacturers have added a number of new structural features to vehicles to improve safety and/or performance. Many of these structural features are applicable to electric, hybrid, and non-electric vehicles equally, while others place a greater emphasis on the vehicle motor type, such as a vehicle base plate with increased thickness for protecting an electric car battery over a specific region of the vehicle. Structural improvements that increase either safety or performance without a significant compromise of the other remain important objectives of vehicle manufacturers.

Electric vehicles are becoming an increasingly viable alternative to traditional vehicles with internal combustion engines. Electric vehicles may have advantages in their compactness, simplicity of design, and in being potentially more environmentally friendly depending on the means by which the electricity used in the vehicle was originally generated. The prospect of using renewable energy sources to power automobiles in place of gasoline has obvious advantages as oil reserves across the globe become increasingly depleted.

BRIEF SUMMARY OF THE INVENTION

Embodiments of the present invention relate generally to a tunnel system extending through a portion of a passenger compartment of an electric vehicle. The tunnel system may provide structural rigidity in the event of a front or rear collision, while also sealing the passenger compartment from the batteries of the electric vehicle. The tunnel system may provide both fire and acid resistance to help protect occupants of the vehicle in the event of a collision. Additionally, the tunnel system allows the batteries to be connected to electrical systems of the vehicle from underneath the floor structure of the vehicle, allowing the batteries to be changed out from the exterior of the vehicle.

In one aspect, a power system for an electric vehicle is provided. The power system may include a firewall positioned between an engine compartment and a passenger compartment of the electric vehicle. The power system may also include a floor structure of the electric vehicle coupled with the firewall. The floor structure may define an aperture between the firewall and a central support beam of the floor structure. The power system may also include a battery assembly configured to mount with an underside of the floor structure. The battery assembly may include at least one battery and a battery connector housing. The battery connector housing may be configured to house at least one battery connector therein. The battery connector housing may define at least one electric connector configured to couple with at least one electric system of the electric vehicle. The battery connector housing may be configured to be inserted within the aperture of the floor structure such that at least a portion of the battery connector housing extends above the floor structure. The power system may also include a rigid tunnel coupled with the firewall, the floor structure, and the central support beam. The rigid tunnel may be configured to cover the portion of the battery connector housing that extends above the floor structure such that the passenger compartment is sealed from the battery connector housing.

In another aspect, a power system for an electric vehicle includes a floor structure of the electric vehicle defining an aperture within a passenger compartment of the electric vehicle. The power system may also include a battery assembly configured to mount with an underside of the floor structure. The battery assembly may be mountable and removable from an underside of the floor structure without accessing the passenger compartment. The battery assembly may include at least one battery and a battery connector housing. The battery connector housing may be configured to house at least one battery connector therein. The battery connector housing may define at least one electric connector configured to couple with at least one electric system of the electric vehicle. The battery connector housing may be configured to be inserted within the aperture of the floor structure such that at least a portion of the battery connector housing extends above the floor structure. The power system may further include a rigid tunnel coupled with the floor structure that is configured to seal the portion of the battery connector housing that extends above the floor structure from the passenger compartment.

In another aspect, a method of installing a battery assembly in an electric vehicle is provided. The method may include positioning a battery assembly against an underside of a floor structure such that a battery connector housing is inserted within and extends through an aperture defined by the floor structure. The battery connector housing may be sealed from a passenger compartment of the electric vehicle by a rigid tunnel. The battery connector housing may extend from an upper surface of a battery of the battery assembly. The battery connector housing may define at least one electric connector configured to couple with at least one electric system of the electric vehicle. The battery assembly may extend along at least a portion of an underside of the electric vehicle. The method may also include fastening the battery assembly to the underside of the floor structure using a plurality of fasteners and electrically coupling the at least one electric system to the at least one electric connector.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1 depicts an electric vehicle according to embodiments.

FIG. 10 is a flowchart depicting a method for absorbing a front impact with an electric vehicle according to embodiments.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The systems and methods described herein relate generally to improvements for electric vehicles. Due to the size and weight considerations of the batteries required to power such vehicles, as well as the need to make electric vehicles as safe as possible, each component within the electric vehicles must be designed with particular characteristics in mind. Specifically, considerations related to the weight and structural integrity of each component must be weighed to ensure that the electric vehicles are both efficient and safe to operate. For example, the body of the vehicle must be stiff, efficient, and lightweight. A lightweight body helps counteract the additional weight of the batteries, which may be in the form of several large batteries, or numerous (sometimes thousands) of smaller batteries wired together. The stiff body helps make the vehicle more stable during cornering and also helps limit damage to the body and batteries during a collision. Protection of the batteries during a collision is particular important, as the large number of batteries pose a significant fire hazard and may also expose passengers and others to highly corrosive material. Due to this high safety risk, it is imperative that the body structure be designed to withstand high force collisions from any direction.

Figure 1:
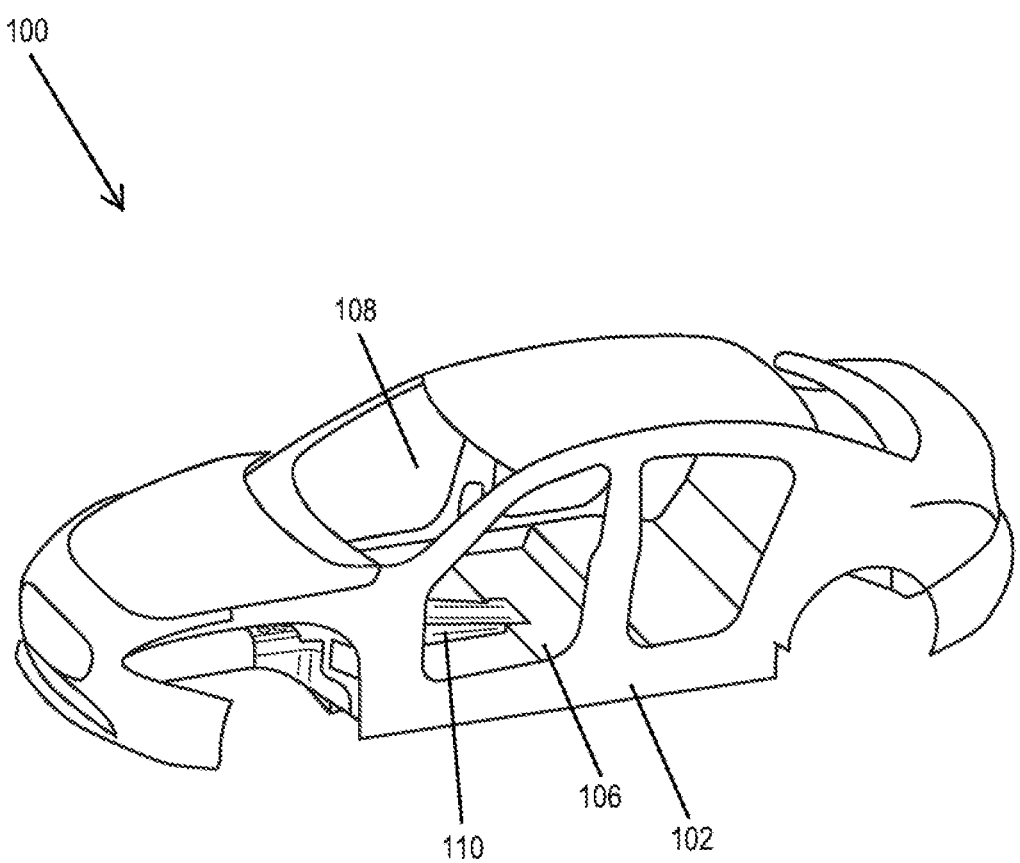

Turning now to FIG. 1, one embodiment of an electric vehicle 100 is shown. While shown here as an electric automobile, electric vehicle 100 may be any motorized vehicle that is powered by electricity. For example, electric vehicle 100 may include vehicles such as cars, buses, trains, trucks, trams, watercraft, aircraft, and/or any other type of transportation mechanism.

Here, much of the main body 102 of the electric vehicle 100, especially those components designed to form the skeleton of the vehicle and those components used for collision protection, are made of aluminum or alloys containing aluminum, although it will be appreciated that other materials may be considered. Aluminum alloys provide strong, yet lightweight components that help shed weight to compensate for the high weight of the batteries necessary to power the electric vehicle. For electric vehicles, an increased emphasis is placed on protection of the batteries as damage to battery cells can cause explosion and fires within the vehicle. Such problems are compounded due to the large amount of space batteries must occupy within electric vehicles in order to maintain practical driving ranges. Therefore, vehicle alterations that provide increased protection along edges and corners of the vehicle battery are advantageous. Such alterations may include considerations related to, but not limited to providing: (1) increased rigidity of the vehicle, (2) increased absorption of energy from a collision, and (3) increased efficiency of transfer of energy/force stemming from an impact to the vehicle's body to lessen the potential impact applied to the vehicle battery and to passengers in the vehicle.

Battery elements 104 (shown in FIG. 2) are positioned underneath a floor structure 106 of the electric vehicle 100. Such positioning provides several benefits. First, the battery elements are isolated from the passenger compartment, largely by an aluminum (or other metallic material) floor structure 106, which helps increase passenger safety. The placement of the battery elements 104 underneath the vehicle 100 also allows the battery elements 104 to be connected to electrical systems of the vehicle 100 from underneath the floor structure 106. This enables the battery elements 104 to be changed out from the exterior of the vehicle 100. For example, the vehicle 100 may be raised up and the battery elements 104 may be decoupled from the underside of the vehicle 100. As just one example, a number of bolts or other fasteners may be removed and the battery elements 104 may be lowered from the vehicle 100. The battery elements 104 may be disconnected and new battery elements 104 may be connected and fastened to the underside of the vehicle 100. This allows old batteries to be replaced easily, and also enables a quick swap of depleted battery elements 104 for charged battery elements 104, serving as a method of rapidly charging the vehicle 100 for longer trips. The placement of the battery elements 104 also places much of the weight of the vehicle 100 near the ground, thus lowering the center of gravity of the vehicle 100, which allows the vehicle 100 to corner better and reduces the odds of a rollover.

Unlike automobiles that utilize internal combustion engines and include drivetrains that extend along a length of the vehicle, electric vehicle 100 is driven by one or more electric motors positioned near the wheel axles. As a result, there is no need for a longitudinal drive train. To help isolate a passenger compartment 108 from the battery elements 104 while providing access for connections of the battery elements 104 to be connected to electric systems within the passenger compartment 108 and to the one or more electric motors, the passenger compartment may be provided with a rigid tunnel 110 protruding upward from a floor structure 106 of the passenger compartment 108. However, unlike in conventional gas-powered vehicles where a tunnel may be provided to provide clearance for a drivetrain, rigid tunnel 110 is included to provide clearance for a portion of the battery elements 104 used to supply power to the electric vehicle 100. The rigid tunnel 110 may not only provide a housing for a portion of the battery assembly, but may serve a number of other functions. As just one example, the rigid tunnel 110 may help absorb and transfer force away from passengers in the event of a collision. In such embodiments, the rigid tunnel 110 may be formed of carbon fiber or another composite material that is extremely strong and lightweight. In other embodiments, the rigid tunnel 110 may serve as part of an air ventilation system, with hot or cold air being vented to the passenger compartment 108 through a portion of the rigid tunnel 110.

Figure 2:
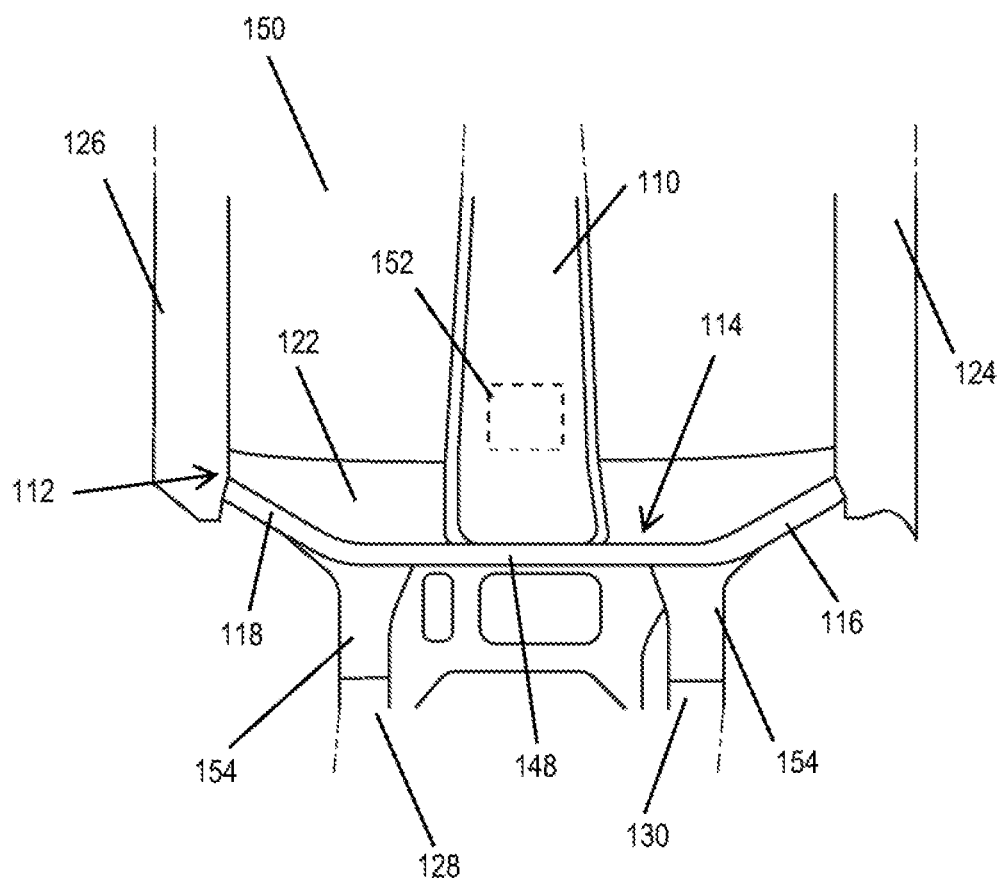
FIG. 2 depicts a top view of a power system of an electric vehicle according to embodiments.

FIG. 2 depicts one embodiment of a power system of the electric vehicle 100. The power system may include a firewall 112 positioned between a motor compartment and a passenger compartment 108 of the electric vehicle 100. The firewall 112 may be formed of several components. For example, the firewall 112 may include a front cross beam 114 having a left portion 116 and a right portion 118 separated by a medial portion 148 extending there between. The left portion 116 and the right portion 118 may each be bent rearward relative to the medial portion 148, thus defining a foot well or other front portion of the passenger compartment 108. For example, the left portion 116 and the right portion 118 may be bent backward at an angle of between about 10 and 40 degrees, more typically between about 25 and 35 degrees, relative to the medial portion 148. The front cross beam 114 may have a generally rectangular cross-section that defines an open interior. In some embodiments, the open interior may include a number of ribs that extend along a length of the front cross beam 114, as better shown in FIG. 6. The firewall 112 may also include an angled portion 122 of the floor structure 106. A horizontal flat portion 150 of floor structure 106 may be coupled with and/or extend rearward from the firewall 112. The flat portion 150 may define an aperture 152 between the firewall 112 and one or more central support beams 132 of the floor structure 106. The angled portion 122 may be coupled with a bottom end of the front cross beam 114. Such coupling is further described in relation to FIG. 6.

In some embodiments, a left longitudinal support beam 124 may be coupled with the left portion 116 and/or the angled portion 122 of the floor structure 106. A right longitudinal support beam 126 may be coupled with the right portion 118 and/or the angled portion 122 of the floor structure 106. A right front crash beam 128 may be coupled with the medial portion 148 and/or the right portion 118 and may be generally orthogonal to a right end of the medial portion 148. A left front crash beam 130 may be coupled with the medial portion 148 and/or the left portion 116 and may be generally orthogonal to a left end of the medial portion 148. In some embodiments, the crash beams 128 and 130 may be coupled directly with the front cross beam 114, while in other embodiments the crash beams 128 and 130 may be coupled with the front cross beam 114 via crash elements 154.

Figure 3:
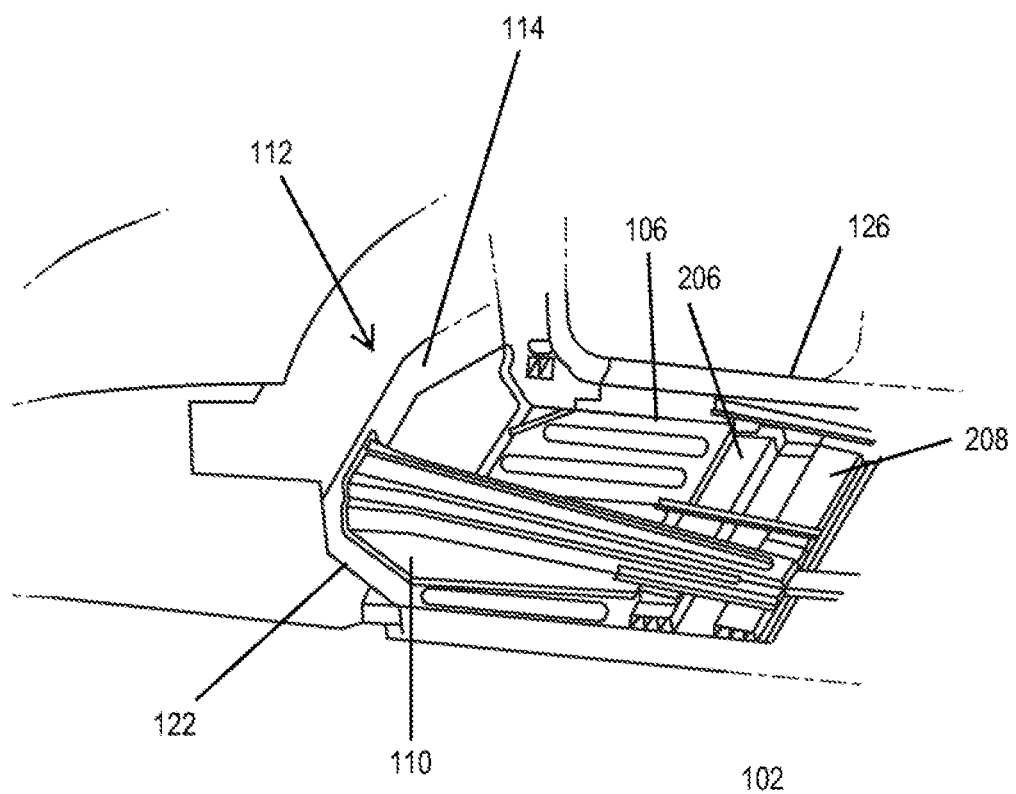
FIG. 3 depicts an isometric view of a tunnel of an electric vehicle according to embodiments.

In some embodiments, the firewall 112 may be coupled with the rigid tunnel 110, which may extend rearward from the firewall 112 to one or more central cross beams 132 as shown in FIG. 3. For example, a front edge of the rigid tunnel 110 may be coupled with a medial portion of the angled portion 122 and a medial portion of the front cross beam 114. The front edge of the rigid tunnel 110 may be open, such that access to the motor compartment may be provided underneath the rigid tunnel 110. A rear portion of the rigid tunnel 110 may be coupled with the central cross beams 132. For example, a forward most of the central cross beams 132 may be coupled with an underside of the rigid tunnel 110, such as within a notch in the rigid tunnel 110 that is configured to receive the forward most central cross beam 132. The rearmost central cross beam 132 may be configured to couple with and/or near a rear edge of the rigid tunnel 110. The central cross beams 132 may extend laterally across a width of the passenger compartment 108. In some embodiments, a top surface of one or more of the central cross beams 132 may be configured to be used as mounting points for the front seats. For example, the top surface of one of more of the central cross beams 132 may define apertures that are configured to receive bolts and/or other fastening mechanisms for coupling seat rails 164 and/or other seat mounts to the central cross member(s) 132. In some embodiments, seat brackets may be mounted to one or more of the central cross beams 132. These brackets may then receive seat rails 164 with which seats may be mounted. Oftentimes, each seat will be mounted to two seat rails 164, although it will be appreciated that other numbers of rails 164 may be used.

In some embodiments, the central cross beams 132 (as well as other support members secured to the floor structure 106, as well as the floor structure 106 itself) may be configured to have the battery assembly 104 mounted thereon. For example, a lower surface of one or more of the central cross beams 132 may be configured to receive one or more removable fastening mechanisms, such as bolts, that are used to secure the battery assembly 104 to an underside of the floor structure 106. As just one example, the central cross beams 132 may be positioned atop the floor structure 106, with the battery element 104 positioned against an underside of the floor structure 106 (possibly with one or more intervening layers and/or components between the battery element 104 and the floor structure. One or more bolts may extend from an underside of the battery element 104, through the floor structure 106, and into an interior of one or more of the central cross beams 132. The bolts or other fasteners may be positioned through apertures in the battery element 104 and/or a flange of the battery element 104. The central cross beams 132 provide strong mounting locations for the battery element 104, allowing the battery element 104 to be larger and provide the vehicle 100 with a longer range.

The central cross beams 132 may also serve to strengthen the sides of the passenger compartment 108 and to protect the passenger compartment 108 in the event of an impact. The front cross beam 114 (and rest of firewall 112) may be configured to transfer force from a frontal collision from the front crash beams 128 and 130 to the one or more central cross beams 132 via the rigid tunnel 110. Additionally or alternatively, the front cross beam 114 (and rest of firewall 112) may also be configured to transfer force from a frontal collision from the front crash beams 128 and 130 to the left longitudinal support beam 124 and the right longitudinal support beam 126.

Figure 4:
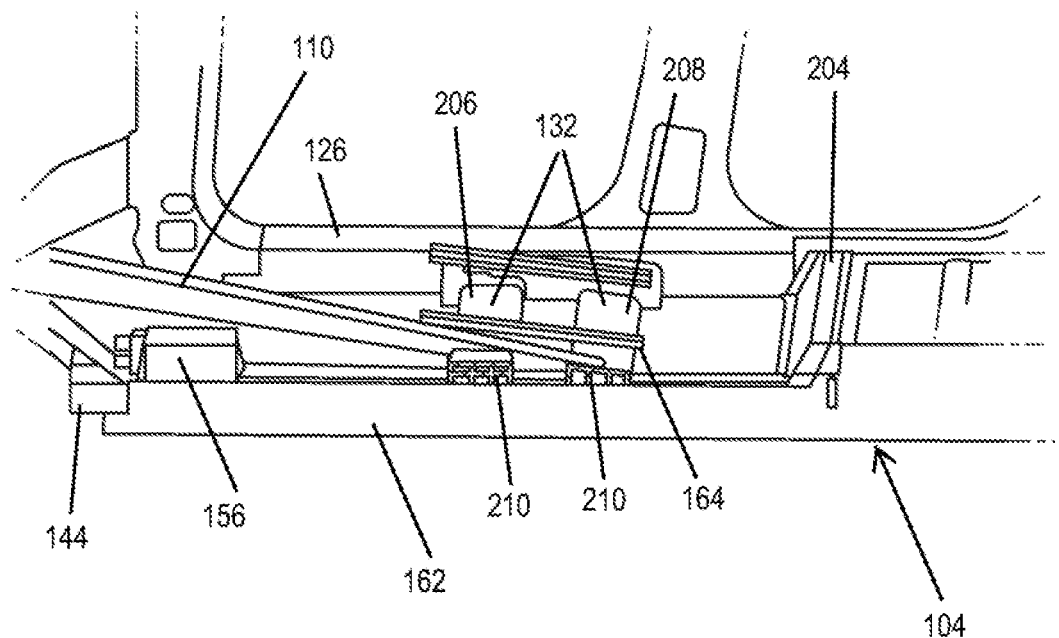
FIG. 4 depicts a cross-section view the tunnel of FIG. 3 according to embodiments.

Battery assembly 104 may be configured to mount with an underside of the floor structure 106. The battery assembly 104 may include at least one battery 162, but often includes a large number of batteries ranging from dozens to thousands, depending on the size of each of the batteries. In some embodiments, the battery 162 includes a number of battery units arranged in two tiers as best seen in FIG. 4. For example, a first tier may extend underneath all or part of the passenger compartment 108, while a second tier may be stacked upon a portion of the first tier such that it extends upward at a position rearward of the passenger compartment 108. In some embodiments, the upper tier of the battery assembly 104 may be positioned rearward of a rear cross beam 204. Rear cross beam 204 may extend across a width of the passenger compartment 108. The rear cross beam 204 may be configured to receive one or more fasteners configured to secure the battery assembly 104 to the underside of the vehicle 100. In some embodiments, the rear cross beam 204 may also be used to mount one or more rear seats within the passenger compartment 108.

The battery assembly 104 may also include a battery connector housing 156. The battery connector housing 156 may be configured to house at least one battery connector therein. The battery connector housing 156 may define at least one electric connector configured to couple with at least one electric system of the electric vehicle 100, such as the electric motor. The battery connector housing 156 may be configured to be inserted within the aperture 152 of the floor structure 106 such that at least a portion of the battery connector housing 156 extends above a top surface of the floor structure 106. This allows the electric connectors to be accessible through a front opening of the rigid tunnel 110, enabling the battery element 104 to be electrically coupled to both the motor and the other electrical systems of the vehicle 100. Battery assembly 104 may be secured to the underside of the floor structure 106 using fasteners accessible from the underside of the floor structure 106 such that the battery assembly 104 is removable from the electric vehicle 100 without accessing the passenger compartment 108. These fasteners may be spaced apart along the underside of the vehicle 100 at the floor structure 106, central cross beams 132, a subfloor cross beam 144, and/or other structural elements, with a spacing and number of fasteners being determined by a weight, size, and/or shape of the battery element 104.

Figure 5:
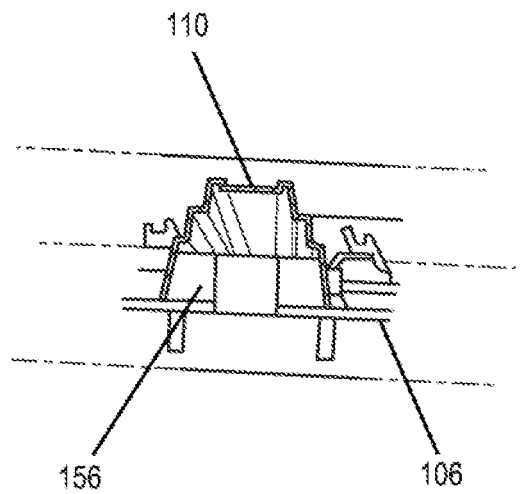
FIG. 5 depicts a front cross-section view of the tunnel of FIG. 3 according to embodiments.

Rigid tunnel 110 may be coupled with the firewall 112, such as at a rear surface of the firewall 112. The rigid tunnel 110 may also be coupled with the floor structure 106 and the central support beams 132. The rigid tunnel 110 may be configured to cover the portion of the battery connector housing 156 that extends above the floor structure 106 such that the passenger compartment 108 is sealed from the battery connector housing 156. In some embodiments, the rigid tunnel 110 has a cross sectional profile that generally matches a profile of the battery connector housing 156 as shown in FIG. 5. As seen here, the rigid tunnel 110 may include extra space above the battery connector housing 156. In such embodiments, the extra space may be used to for additional features. For example, in one embodiment, the extra space may be used to provide a conduit for the air conditioner and heating system. In some embodiments, the floor structure 106 includes a sealing element (not shown) protruding upward and contacting an inner surface of the rigid tunnel 110 between the battery connector housing 156 and the central support beams 132. The sealing element may have a shape corresponding to the rigid tunnel 110. This sealing element may further insulate the passenger compartment 108 from the battery element 104, especially as the profile of the rigid tunnel 110 decreases in size at rearward portions.

In some embodiments, the rigid tunnel 110 may be designed to transfer frontal impact away from occupants of the vehicle 100. For example, the rigid tunnel 110 may be coupled with a rear surface of the front cross beam 114 and a top surface of the angled medial section 142 of the floor structure 106. Frontal impact forces received by the firewall 112 may be transferred through the rigid tunnel 110, which may transmit the forces to one or more central crossbeams 132 positioned rearward of the firewall 112. Such diversion of forces may ensure that a maximum amount of force is directed around occupants of the vehicle 100. To provide the strength necessary to transfer the impact forces while limiting the amount of weight added, the rigid tunnel 110 may be formed from carbon fiber.

Because the battery element 104 is positioned under the rigid tunnel 110, to ensure maximum safety of the passenger compartment 108, it may be desirable to include an acid resistant and/or flame resistant material to the rigid tunnel 110 to increase protection of the passenger compartment 108 in the event of battery damage, which may result in exposure to battery acid or flames. For example, the rigid tunnel 110 may be formed from materials with strong resistance to flame and/or acid. In other embodiments, one or more surfaces of the rigid tunnel 110 may be coated with an acid resistant and/or flame resistant material. In particular, a lower surface of the rigid tunnel 110 may be coated to protect against direct exposure to a damaged battery. In other embodiments, a separate acid and/or fire resistant material may be coupled with an underside of the rigid tunnel 110. Additionally, due to the rigid tunnel 110 being configured to cover a hole in the floor structure 106 that enables the connector 158 to extend upward above the floor structure 106, the rigid tunnel 110 may include thermal insulation and/or acoustic insulation, as such insulation may not be included on the battery element 104. This allows road noise, as well as thermal effects from the environment and/or the battery element 104 to be reduced within the passenger compartment 108.

Figure 6:
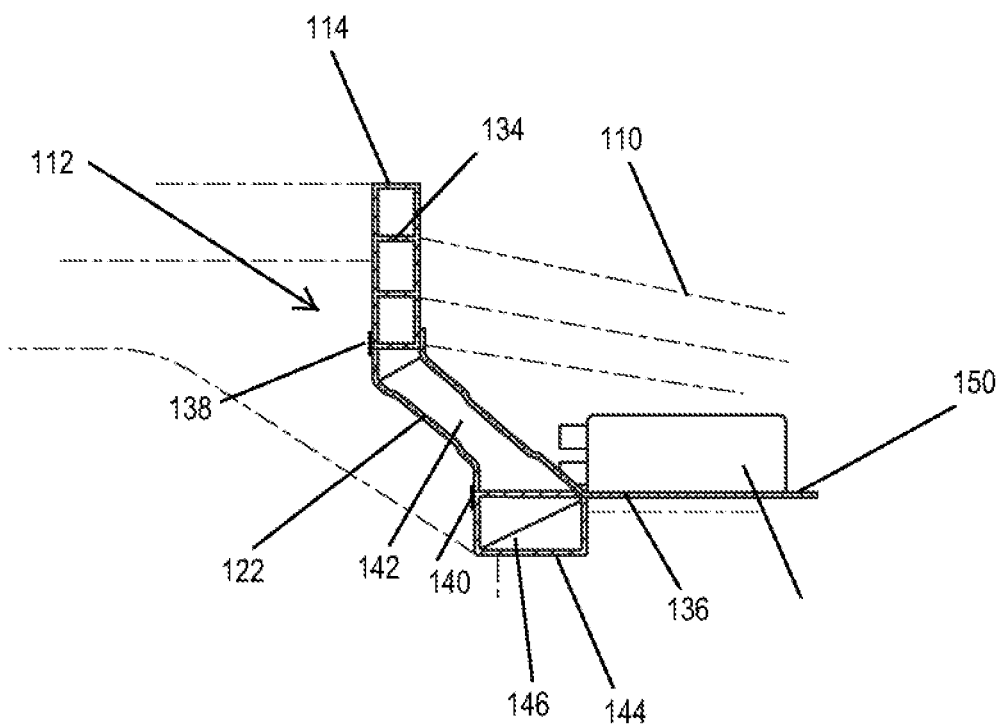
FIG. 6 depicts a side cross-section view of the firewall of FIG. 2 an electric vehicle according to embodiments.

FIG. 6 shows a cross-sectional view of the firewall 112 of FIG. 2. As shown here, firewall 112 is formed from the junction of the front cross beam 114 and the angled portion 122 of the floor structure 106. As noted above, the firewall 112 defines a front portion of the passenger compartment 108, such as a passenger and/or driver foot well and separates the passenger compartment 108 from a motor compartment of the electric vehicle 100. As shown here, the firewall 112 includes front cross beam 114 having left portion 116, right portion, 118, and medial portion 148 extending between the left portion 116 and right portion 118, which may be bent rearward relative to the medial portion 148. Front cross beam 114 may define an interior including a number of ribs 134 that extend along a length of the front cross beam 114. For example, at least two ribs 134 may extend from a front wall of the front cross beam 114 to a rear wall of the front cross beam 114. The front cross beam 114 may have a generally rectangular cross-section. The ribs 134 may be positioned at regular intervals as shown here, or may be spaced at irregular intervals. Here, two ribs 134 are spaced equidistant from one another and the top and bottom of the front cross beam 114, forming three rectangular chambers within the front cross beam 114. The use of ribs 134 helps stiffen and strengthen the front cross beam 114 without adding a substantial amount of material or weight, thereby allowing the front cross beam 114 to handle larger impact forces in the event of a collision.

The firewall 112 may also include floor structure 106. Specifically, floor structure 106 may include an angled portion 122 that angles upward from a base 136 of the floor structure 106 to form a portion of a front foot well of the passenger compartment 108. This angled portion 122 may be coupled with a bottom end of the front cross beam 114. For example, the angled portion 122 may include at least one upper flange or mounting interface 138 that is generally aligned with a vertical axis of the firewall 112. The upper flanges 138 may be coupled with a bottom end of the front cross beam 114. For example, a front upper flange 138 may be secured against a front surface of the front cross beam 114 and a rear upper flange 138 may be secured against a rear surface of the front cross beam 114 such that the front cross beam 114 is secured between the front upper flange 138 and the rear upper flange 138. For example, the front cross beam 114 may be inserted between the upper flanges 138 and secured using one or more fasteners. The angled portion 122 may also include at least one lower flange or mounting interface 140 that is separated from the upper flange 138 by an angled medial section 142 that slopes downward from front to back. The lower mounting interface 140 may include a front lower flange 140 configured to be fastened against a front surface of a subfloor cross beam 144 and a rear lower flange 140 configured to be fastened against a top surface of the subfloor cross beam 144.

In some embodiments, the angled medial section 142 of the floor structure 106 includes one or more embossed features formed in a top surface and/or a bottom surface of the angled medial section 142. The angled medial section 142 may also include a number of ribs (not shown) extending from a top surface to a bottom surface of the angled medial section 142. The ribs and/or embossed features may serve to further strengthen the floor structure 106 without adding substantial material and weight. The lower flange 140 may be generally aligned with a horizontal axis of the firewall 112. The firewall 112 may also include subfloor cross beam 144 positioned underneath the floor structure 106 and coupled with the lower flange 140 such that the subfloor cross beam 144 is spaced laterally rearward of the medial portion 184 of the front cross beam 114. The subfloor cross beam 144 may define an interior that includes at least one rib 146 extending along a length of the subfloor cross beam 144. In some embodiments, rib 146 may extend between a front corner and a rear corner of the subfloor cross beam 144. For example, the rib 146 may extend from a front lower corner of the subfloor cross beam 144 to a rear upper corner of the subfloor cross beam 144. This rib 146 helps stiffen and strengthen the subfloor cross beam 144 without adding a substantial amount of material or weight. In some embodiments, the subfloor cross beam 144 may receive one or more fasteners for coupling the battery assembly 104 to the underside of the vehicle 100.

Oftentimes, the firewall 112 may be formed entirely from aluminum. For example, the front cross beam 114 and the subfloor cross beam 144 may be formed of extruded aluminum, which makes it easier to form any ribs integral with the beams to ensure maximum strength. In some embodiments, the angled portion 122 of the floor structure 106 (and the floor structure 106 itself) may be formed from cast or pressed aluminum. Such formation is more suited for producing the embossed features within surfaces of the floor structure 106 that increase the strength and/or stiffen the floor structure 106.

In some embodiments, a front surface of the firewall 112 is coupled with one or more front crash beams 128 and 130. In some embodiments, the firewall 112 may be directly coupled to the front crash beams 128 and 130, while in other embodiments, one or more components, such as a crash element 154, may be coupled between the front crash beams 128 and 130 and the firewall 112. In the event of a frontal impact, the firewall 112 may be configured to receive and absorb a force transferred from the front crash beams 128 and 148. The firewall 112 may also be configured to direct force away from passengers, such as by directing the force around the front seats to structural components designed to handle impact forces. For example, as described with regard to FIG. 2, ends of the firewall 112 may be coupled with longitudinal support beams 124 and 126 that extend along sides of the vehicle 100. Impact forces may be transferred to these longitudinal support beams 124 and 126 to direct the main forces around the passenger compartment 108 to protect occupants in the event of a collision. The firewall 112 may also be coupled with the rigid tunnel 110. For example, the rigid tunnel 110 may be coupled with a rear surface of the front cross beam 114 and a top surface of the angled medial section 142 of the floor structure 106. Frontal impact forces received by the firewall 112 may be transferred through the rigid tunnel 110, which may transmit the forces to one or more central crossbeams (not shown) positioned rearward of the firewall 112. Such diversion of forces may ensure that a maximum amount of force is directed around occupants of the vehicle 100.

Figure 7:
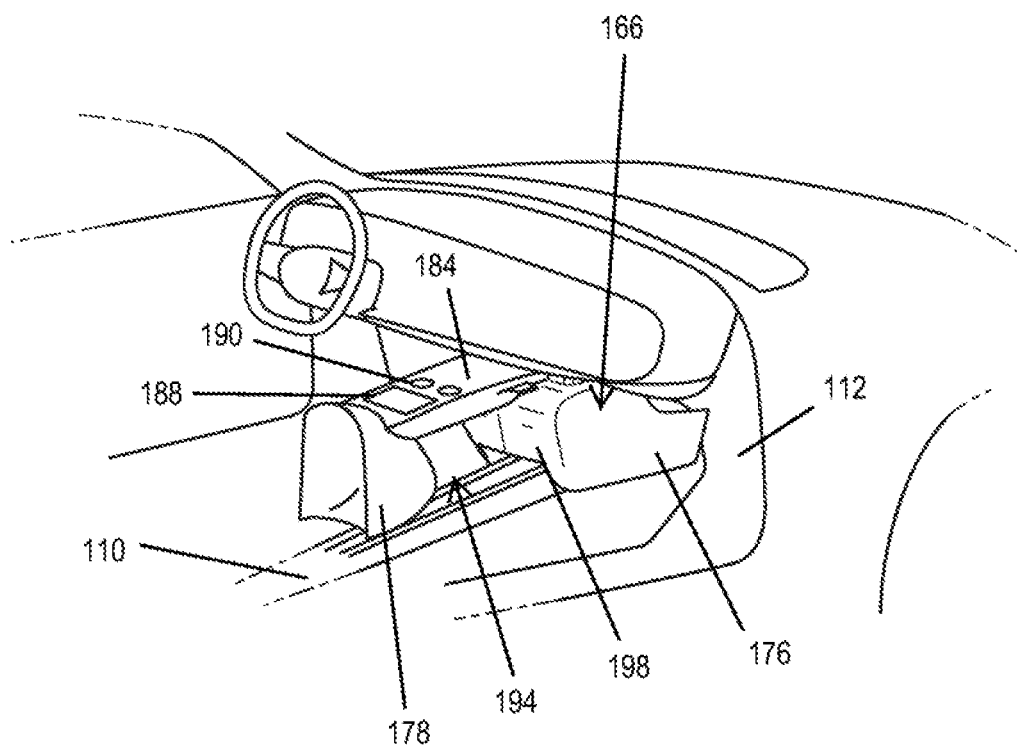
FIG. 7 depicts a storage area of an electric vehicle according to embodiments.

FIG. 7 depicts a storage area of the electric vehicle 100. The storage area may include the rigid tunnel 110 that positioned within passenger compartment 108. Rigid tunnel 110 may be coupled with a firewall 112 that is configured to separate the passenger compartment 108 from a motor compartment of the vehicle 100. For example, the rigid tunnel 110 may be coupled at a rear surface of the firewall 112. The rigid tunnel 110 may also be coupled with the floor structure 106 and one or more central support beams (not shown). The rigid tunnel 110 may be configured to cover a portion of the battery assembly 104 that extends above the floor structure 106 such that the passenger compartment 108 is sealed from the battery assembly 104. In some embodiments, the rigid tunnel 110 has a cross sectional profile that generally matches a profile of the portion of the battery assembly 104 extending beyond the floor structure 106. In some embodiments, a front section of the rigid tunnel 110 projects higher into the passenger compartment 108 than a rear section of the rigid tunnel 110.

The storage area may also include a center console 166 positioned within the passenger compartment 108. The center console may include a front portion 176 that is coupled with the front section of the rigid tunnel 110 at a position near the firewall 112. Center console 166 may also include a rear portion 178 that is coupled with the rear section of the rigid tunnel 110. A medial portion 184 may extend between the front portion 176 and the rear portion 178. The medial portion 184 may be relatively thin, such that the medial portion 184 is suspended a distance above the rigid tunnel 110. The thickness of the medial portion 184 is less than a thickness of each of the front portion 176 and the rear portion 178.

In some embodiments, a top surface of the medial portion 184 defines a storage tray 188 and at least two cup holders 190. In some cases, a thickness of the medial portion 184 may be slightly thicker than a depth of the cup holders 190. A space 194 between the top surface of the rigid tunnel 110 and a bottom surface of the medial portion 184 may define the storage area. In some embodiments, the space 194 may be positioned under the cup holders 190.

In some embodiments, space 194 may be open both from the passenger side and the driver side. One or more drawers 198 may be provided that open into the space 194. For example, a driver side drawer 198 and a passenger side drawer 198 may be positioned beneath the front portion 176 of the center console and function as additional glove boxes or other storage areas. In some embodiments, the one or more drawers 198 may be lockable. In some embodiments, the drawers 198 and/or rest of space 194 may include one or more lights. In some embodiments, the space 194 may include charging or data ports, such as universal serial port (USB) ports, AC adapters, auxiliary connections, and the like.

In some embodiments, space 194 may be a closed area contained between walls and/or doors extending between the medial portion 184, front portion 176, rear portion 178, and rigid tunnel 110. Space 194 may be accessible from one side only, or from both a driver side and a passenger side. In some embodiments, the storage area includes at least one door for controlling access to the space. The door may be positioned on the passenger side and/or the driver side of the storage area. In other embodiments, access to the space 194 may be gained from a top surface of the center console 166. For example, the top surface of the center console 166 may define an aperture configured to provide access to the space 194. The aperture may be covered by a door or other removable cover. In some embodiments, the door is lockable to provide a secure area to protect valuables and keep them out of sight when the vehicle 100 is unattended. In some embodiments, rather than having one or more doors or closed walls, the space 194 may define an open shelf that provides quick access to items such as maps, sunglasses, loose change, and the like.

Figure 8:
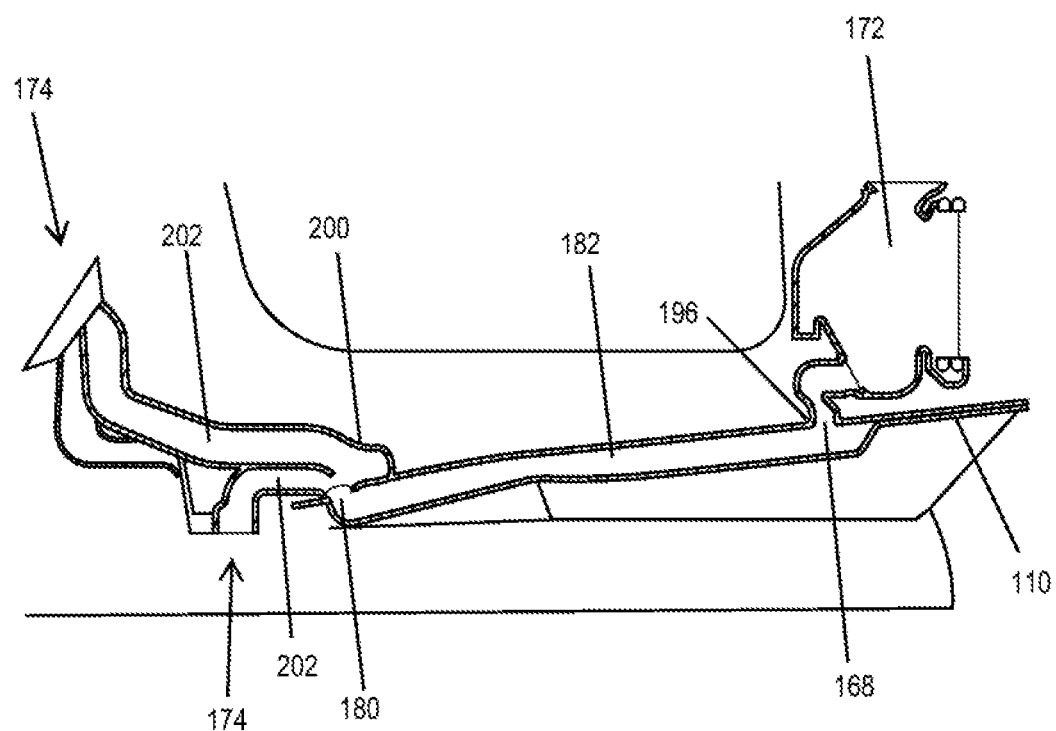
FIG. 8 depicts an air ventilation system of an electric vehicle according to embodiments.

FIG. 8 depicts an isometric view of a rear passenger seating area air ventilation system of the electric vehicle 100. The ventilation system may be formed from the rigid tunnel 110 positioned within the passenger compartment 108 of the electric vehicle 100. As noted above, the primary function of the rigid tunnel 110 may be to cover a portion of a battery assembly or other battery element 104 that extends above a floor structure 106 of the electric vehicle 100 such that the passenger compartment 108 is sealed from the battery assembly 104. The rigid tunnel 110 may also provide a pathway for air from one or more air supply systems 172 to be delivered to a rear of the passenger compartment 108. For example, the air supply system 172 may include an air conditioner and/or heater system. The air may be delivered to one or more air vents 174, which may then direct the air to one or more areas in the rear of the passenger compartment 108.

As shown, the rigid tunnel 110 defines a forward opening 168 and a rear opening 180 connected by a conduit 182 extending along at least a portion of a length of the rigid tunnel 110. The conduit 182 may be disposed within an interior of the rigid tunnel 110. In some embodiments, the conduit 182 may be formed as a part of the rigid tunnel 110, while in other embodiments, the conduit 182 may be a separately formed component that may be coupled within the interior of the rigid tunnel 110. As just one example, both the rigid tunnel 110 and the conduit 182 may be formed of carbon fiber or another composite material. In other embodiments, one or both of the components may be formed of different materials. For example, the conduit 182 may be formed from aluminum, such as pressed aluminum. In some embodiments, the conduit 182 may extend along an upper surface of the rigid tunnel 110. For example, the conduit 182 may direct air from the air supply system 172 downward from a front of the rigid tunnel 110 to a lower rear of the rigid tunnel 110 to match a downward slope of the rigid tunnel 110. The conduit 182 may be positioned above a connector 156 of the battery element 104.

Because the battery element 104 is positioned under both the conduit 182 and the rigid tunnel 110, to ensure maximum safety of the passenger compartment 108, it may be desirable to include an acid resistant and/or flame resistant material to one or both of the components to increase protection of the passenger compartment 108 in the event of battery damage, which may result in exposure to battery acid or flames. For example, the rigid tunnel 110 and/or conduit 182 may be formed from materials with strong resistance to flame and/or acid. In other embodiments, one or more surfaces of the rigid tunnel 110 and/or conduit 182 may be coated with an acid resistant and/or flame resistant material. In particular, a lower surface of the rigid tunnel 110 and/or the conduit 182 may be coated to protect against direct exposure to a damaged battery. In other embodiments, a separate acid and/or fire resistant material may be coupled with an underside of the rigid tunnel 110 and/or conduit 182. Additionally, due to the rigid tunnel 110 being configured to cover a hole in the floor structure 106 that enables the connector 156 to extend upward above the floor structure 106, one or both of the rigid tunnel 110 and the conduit 182 may include thermal insulation and/or acoustic insulation, as such insulation may not be included on the battery element 104. This allows road noise, as well as thermal effects from the environment and/or the battery element 104 to be reduced within the passenger compartment 108.

The air supply system 172 may include a port 196 that interfaces with the forward opening 168 to deliver air to the conduit 182. The air may pass through the conduit 182 and through the rear opening 180 and into the air vents 174 for delivery to a rear seating area of the passenger compartment 108. The air vents 174 may be positioned such that the air from the air supply 172 may be delivered to specific locations within the rear of the passenger compartment 108. For example, the air vents 174 may be configured to deliver the air to a height near the floor structure 106, such as by positioning at least some of the air vents under a front seat of the electric vehicle 100 such that the air is directed to a low position. In some embodiments, the air vents 174 may be configured to deliver the air approximately near a rear seat height. For example, at least some of the air vents 174 may be positioned within the center console 186 and/or within a front seat back such that the air is delivered to a seat and/or torso height of the rear of the passenger compartment 108.

In some embodiments, such as those where multiple air vents 174 are provided in different locations of the rear of the passenger compartment 108, a manifold 200 may be coupled between the rear opening 180 and the air vents 174 and configured to direct the air from the conduit 182 into the air vents 174. In some embodiments, the manifold 200 may include a first set of air flow pipes 202 configured to direct air from the conduit 182 downward and/or outward to lower air vents 174. For example, for air vents 174 positioned under a front seat of the electric vehicle 100, the air flow pipes 202 may direct the air laterally outward from the conduit 182 and downward to a position proximate the floor structure 106. For air vents 174 positioned in a lower portion of the center console 186, the air flow pipes 202 may direct the air rearward. Air flow pipes 202 may be configured to direct air from the conduit upward and/or outward to upper air vents 174. For example, for air vents 174 positioned within front seat backs, the air flow pipes 202 may direct air both laterally outward to the front seats and upward to a height proximate the rear seat surfaces. For air vents 174 within an upper portion of the center console 186, the air flow pipes 202 may direct the air upward from the rear opening 180 of the conduit 182 to a desired height.

Figure 9:
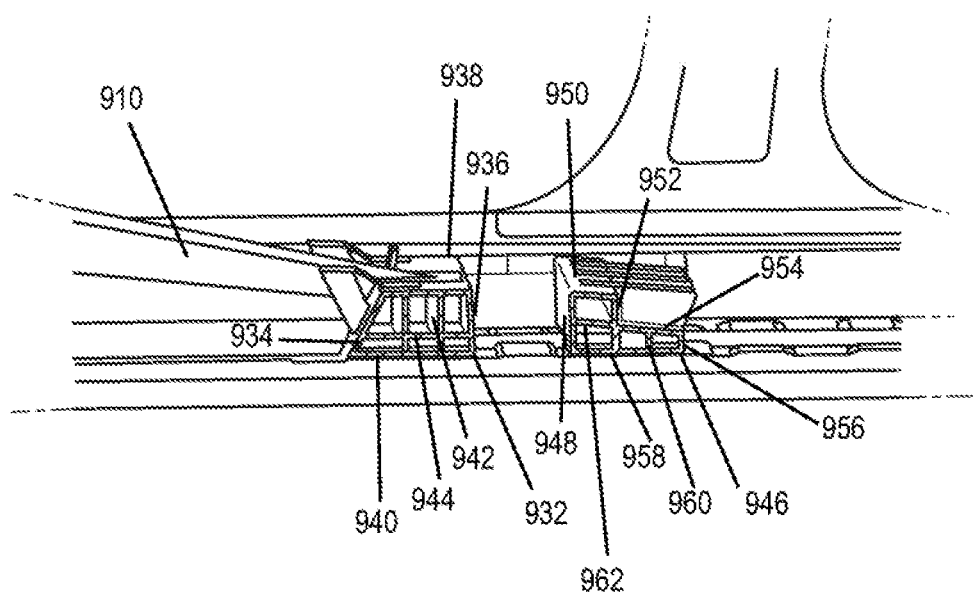
FIG. 9 depicts a tunnel of an electric vehicle according to embodiments.

FIG. 9 depicts an alternative embodiment of a rigid tunnel 910. Here, rigid tunnel 910 extends only to a forward most central cross beam 932. The forward most central cross beam 932 has a side profile defined by a front side 934, a rear side 936, a top side 938, and a bottom side 940. In some embodiments, the front side 934 and the rear side 936 may not be parallel. For example, the front side 934 may be angled forward and downward from the top side 938. A rear end of the rigid tunnel 910 may be coupled with the top side 938 and/or the front side 934 of the forward most central cross beam 932. The rigid tunnel 910 may include a flange 912 that couples with the top side 938 and/or the front side 934 of the forward most central cross beam 932. In some embodiments, the forward most central cross beam 932 may define an interior that includes a plurality of ribs 942. The ribs 942 extend vertically between the top side 938 and the bottom side 940. Here, two ribs are disposed within the interior such that two rectangular chambers and a trapezoidal chamber are formed. Additional horizontal ribs 944 may be provided within the chambers. For example, each of the chambers may include at least one rib 944 that divides the chamber into multiple sections. Ribs 944 provide additional strength and rigidity to the vertical ribs 942. The use of ribs 942 and 944 help stiffen and strengthen the forward most central cross beam 932 without adding a substantial amount of material or weight, thereby allowing the forward most central cross beam 932 to handle larger impact forces in the event of a collision.

The rearmost central cross beam 946 may have a profile defined by a front side 948, a first top side 950, an intermediate wall 952, a second top side 954, a rear side 956, and a bottom side 958. The profile may be shaped such that a forward portion of the rearmost central cross beam 946 is larger than a rear portion of the rearmost central cross beam 946. In some embodiments, one or both of the first top side 950 and the second top side 954 may be sloped downward from front to back. The sloped surface may be configured to receive one or more brackets on which seats and/or seat rails may be mounted. In some embodiments, the sides of the rearmost central cross beam 946 define an open interior. A plurality of ribs 960 may extend within the open interior. The ribs 960 extend vertically between the second top side 954 and the bottom side 958. Here, two ribs are disposed within the interior, with a forward rib being in line with the intermediate wall 952. An additional horizontal rib 962 may be provided within the interior. For example, a horizontal rib 962 may extend into a forward portion of the rearmost central cross beam 946 in line with the second top side 954. The use of ribs 960 and 962 help stiffen and strengthen the rearmost central cross beam 946 without adding a substantial amount of material or weight, thereby allowing the rearmost central cross beam 946 to handle larger impact forces in the event of a collision.

FIG. 10 is a flowchart of a process 1000 of installing a battery assembly in an electric vehicle. Process 1000 may be done using the electric vehicle 100 described herein. Process 1000 may begin by positioning a battery assembly against an underside of a floor structure of an electric vehicle at block 1002. This may involve inserting a battery connector housing within an aperture defined by the floor structure such that the battery connector housing extends through the aperture. In some embodiments, the aperture is positioned between a firewall and a central support beam of the electric vehicle. The firewall may be positioned between an engine compartment and the passenger compartment of the electric vehicle. The battery connector housing may be sealed from a passenger compartment of the electric vehicle by a rigid tunnel. For example, rigid tunnel 110 described above may be used to seal the passenger compartment from the battery connector housing (and the rest of the battery assembly). In some embodiments, the rigid tunnel extends between the firewall and the central support. The rigid tunnel may include one or more of a fire resistant material, an acid resistant material, an acoustic insulator, and a thermal insulator to help protect the passenger compartment from harm in the event of battery damage.

The battery connector housing may extend from an upper surface of a battery of the battery assembly. The battery connector housing may define at least one electric connector configured to couple with at least one electric system of the electric vehicle. The battery assembly extends along at least a portion of an underside of the electric vehicle. At block 1004, the battery assembly is fastened to the underside of the floor structure using a plurality of fasteners. For example, bolts may be inserted within apertures defined by the battery assembly and may be tightened to secure the battery assembly against the underside of the floor structure or other structure of the electric vehicle. In some embodiments, the plurality of fasteners is accessible from the underside of the floor structure such that the battery assembly is removable from the electric vehicle without accessing the passenger compartment. This allows the installation and/or removal of the battery assembly entirely from outside the electric vehicle, without the need to remove floor mats, seats, and/or any other interior components of the vehicle to gain access to the fasteners. At block 1006, the at least one electric system is electrically coupled to the at least one electric connector. For example, the at least one electric connector may be plugged into one or more electric ports of the electric vehicle.

In some embodiments, the battery assembly may need to be removed for replacement, charging, or other service. In such embodiments, the at least one electric system may be disconnected from the at least one electric connector. The plurality of fasteners may be unfastened from outside of the passenger compartment and the battery assembly may be removed from the underside of the floor structure such that the battery connector housing is pulled through the aperture. At this point, a new battery assembly may be attached in a manner similar to process 1000. This allows the battery assemblies to be quickly and easily swapped, thus enabling a feasible technique for immediately recharging the electric vehicle, such as for long trips.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A power system for an electric vehicle, the power system comprising:
    a firewall positioned between an engine compartment and a passenger compartment of the electric vehicle;
    a floor structure of the electric vehicle coupled with the firewall, the floor structure defining an aperture between the firewall and a central support beam of the floor structure;
    a battery assembly configured to mount with an underside of the floor structure, the battery comprising:
        at least one battery; and
        a battery connector housing, the battery connector housing being configured to house at least one battery connector therein, the battery connector housing defining at least one electric connector configured to couple with at least one electric system of the electric vehicle, the battery connector housing being configured to be inserted within the aperture of the floor structure such that at least a portion of the battery connector housing extends above the floor structure; and
        a rigid tunnel coupled with the firewall, the floor structure, and the central support beam, the rigid tunnel being configured to cover the portion of the battery connector housing that extends above the floor structure such that the passenger compartment is sealed from the battery connector housing.

2. The power system for an electric vehicle of claim 1, wherein:
    the rigid tunnel has a profile that generally matches a profile of the battery connector housing.

3. The power system for an electric vehicle of claim 1, wherein:
    the rigid tunnel comprises one or both of an acoustic insulation and a thermal insulation.

4. The power system for an electric vehicle of claim 1, wherein:
    the rigid tunnel is further configured to transfer force from a front impact from the firewall to the central support beam.

5. The power system for an electric vehicle of claim 1, wherein:
    the battery assembly is secured to the underside of the floor structures using fasteners accessible from the underside of the floor structure such that the battery assembly is removable from the electric vehicle without accessing the passenger compartment.

6. The power system for an electric vehicle of claim 1, wherein:
    the rigid tunnel extends between the firewall and the central support beam.

7. The power system for an electric vehicle of claim 1, wherein:
    the floor structure comprises a sealing element protruding upward and contacting a portion of the rigid tunnel between the battery connector housing and the central support beam, the sealing element having a shape corresponding to the rigid tunnel.

8. A power system for an electric vehicle, the power system comprising:
    a floor structure of the electric vehicle defining an aperture within a passenger compartment of the electric vehicle;
    a battery assembly configured to mount with an underside of the floor structure, wherein the battery assembly is mountable and removable from an underside of the floor structure without accessing the passenger compartment, the battery assembly comprising:
        at least one battery; and
        a battery connector housing, the battery connector housing being configured to house at least one battery connector therein, the battery connector housing defining at least one electric connector configured to couple with at least one electric system of the electric vehicle, the battery connector housing being configured to be inserted within the aperture of the floor structure such that at least a portion of the battery connector housing extends above the floor structure; and
    a rigid tunnel coupled with the floor structure that is configured to seal the portion of the battery connector housing that extends above the floor structure from the passenger compartment.

9. The power system for an electric vehicle of claim 8, wherein:
    the battery comprises a plurality of battery units arranged in two tiers.

10. The power system for an electric vehicle of claim 8, wherein:
    the rigid tunnel comprises carbon fiber.

11. The power system for an electric vehicle of claim 8, wherein:
    the rigid tunnel comprises one or more of a fire resistant material or an acid resistant material.

12. The power system for an electric vehicle of claim 8, wherein:
    the rigid tunnel comprises one or both of an acoustic insulation and a thermal insulation.

13. The power system for an electric vehicle of claim 8, wherein:
    the battery assembly is mounted to the underside of the floor structures using a plurality of fasteners accessible from the underside of the floor structure.

14. A method of installing a battery assembly in an electric vehicle, the method comprising:
    positioning a battery assembly against an underside of a floor structure such that a battery connector housing is inserted within and extends through an aperture defined by the floor structure, the battery connector housing being sealed from a passenger compartment of the electric vehicle by a rigid tunnel, wherein:
        the battery connector housing extends from an upper surface of a battery of the battery assembly;

the battery connector housing defines at least one electric connector configured to couple with at least one electric system of the electric vehicle; and the battery assembly extends along at least a portion of an underside of the electric vehicle;

fastening the battery assembly to the underside of the floor structure using a plurality of fasteners; and electrically coupling the at least one electric system to the at least one electric connector.

15. The method of installing a battery assembly in an electric vehicle of claim 14, further comprising:

disconnecting the at least one electric system from the at least one electric connector;

unfastening the plurality of fasteners from outside of the passenger compartment; and removing the battery assembly from the underside of the floor structure such that the battery connector housing is pulled through the aperture.

16. The method of installing a battery assembly in an electric vehicle of claim 14, wherein:

the plurality of fasteners are accessible from the underside of the floor structure such that the battery assembly is removable from the electric vehicle without accessing the passenger compartment.

17. The method of installing a battery assembly in an electric vehicle of claim 14, wherein:

the aperture is positioned between a firewall and a central support beam of the electric vehicle.

18. The method of installing a battery assembly in an electric vehicle of claim 17, wherein:

the firewall is positioned between an engine compartment and the passenger compartment of the electric vehicle.

19. The method of installing a battery assembly in an electric vehicle of claim 17, wherein:

the rigid tunnel extends between the firewall and the central support beam.

20. The method of installing a battery assembly in an electric vehicle of claim 14, wherein:

the rigid tunnel comprises one or more of a fire resistant material, an acid resistant material, an acoustic insulator, and a thermal insulator.

* * * * *